United States Patent
Melrose

[11] 3,754,822
[45] Aug. 28, 1973

[54] SCANNING SYSTEM
[75] Inventor: Lawrence E. Melrose, Webster, N.Y.
[73] Assignee: Xerox Corporation, Rochester, N.Y.
[22] Filed: Feb. 26, 1971
[21] Appl. No.: 119,406

Related U.S. Application Data
[63] Continuation of Ser. No. 880,577, Nov. 26, 1969, abandoned.

[52] U.S. Cl. .................................................. 355/8
[51] Int. Cl. ............................................. G03g 15/04
[58] Field of Search .................... 355/3, 8, 50, 84

[56] References Cited
UNITED STATES PATENTS
| | | | |
|---|---|---|---|
| 3,592,542 | 7/1971 | Kaufer | 355/50 |
| 3,584,950 | 6/1971 | Gundlach | 355/50 |
| 3,451,752 | 6/1969 | Frank | 355/8 |
| 3,486,819 | 12/1969 | Di Giulio | 355/8 X |

Primary Examiner—Samuel S. Matthews
Assistant Examiner—Kenneth C. Hutchison
Attorney—Donald F. Daley

[57] ABSTRACT

An optical scanning system for minimizing the time required for exposing information on a document to a continuously moving photosensitive member, having a moving transparent platen which supports the document in a plane parallel to the photosensitive member and transports the document in the same direction and at the same speed as that of the photosensitive member, and a scanning device including a lamp and lens movably disposed between the document and photosensitive member which, during exposure of the photosensitive member, moves in the direction opposite the direction of the document and photosensitive member. The system, in one embodiment, includes a photosensitive member in the form of an endless belt which is exposed in a flat plane and a charging device attached to the scanning device which is adapted to deposit an electrostatic charge on the belt immediately prior to the belt being exposed to the light pattern.

9 Claims, 6 Drawing Figures

Patented Aug. 28, 1973

INVENTOR.
LAWRENCE E. MELROSE
BY
ATTORNEY

SCANNING SYSTEM

This application is a continuation of application Ser. No. 880,577, filed Nov. 26, 1969, now abandoned.

BACKGROUND OF THE INVENTION

The present invention relates to an optical scanning system and more particularly to a system for exposing a moving photosensitive member to a light pattern conforming to the information to be reproduced.

In reproduction systems in which a photosensitive member is exposed to a light pattern conforming to the information on a document, or the like, being reproduced, the document is commonly scanned increment by increment with a light source and the light pattern reflected therefrom is focused by a lens onto the photosensitive member. There are several known systems for scanning a document in this manner including those in which the photosensitive member is stationary during exposure and those in which the photosensitive member moves continuously during exposure. If both the photosensitive member and document remain stationary during the exposure step, the light source and lens can move between the two at any convenient speed to form an image on the photosensitive member. An inherent disadvantage to this type of system is that the photosensitive member must always be absolutely stationary during exposure in order to form a sharp, clear image on each part of the photosensitive member. However, a high-speed reproduction process cannot be easily fashioned from a copier wherein the primary element of the reproduction apparatus, that is, the photosensitive member, must necessarily be operated intermittently.

In a continuous reproduction system wherein the photosensitive member moves continually through various process stations of the reproduction process, the original document can be exposed onto the photosensitive member increment by increment. This can be accomplished by moving the original document adjacent the photosensitive surface at a speed synchronous to that of the plate. A stationary light source is located between the moving document and the photosensitive member which illuminates each increment of the original document as it passes and reflects the resulting light pattern through a lens and small slit and onto the photosensitive member. A drawback to the exposure system described above is that the speed at which the latent image is formed on the photosensitive member is limited by the speed of the original document. Because of this, when each document is being copied, it must remain on the platen until the corresponding portion of the photosensitive member has completely passed the lens system. In the case where only one copy of many original documents is to be made, each document has to be removed from the platen after the scanning operation is completed and another placed on the platen before the next scanning operation takes place. Since the original document must necessarily be changed after the corresponding portion of the photosensitive surface leaves the exposure station, the time for changing the original document becomes an additional limiting factor on the speed of the copier.

A second approach to exposing a document onto a moving plate is to place the original document on a fixed platen and scan it at a speed synchronous with the speed of the photosensitive member. The speed of this type of system is restricted by the time required for changing the original document as well as an additional time-consuming factor. Since the scanning device moves from an initial position to an end-of-scan position during the exposure phase, it must be returned to the initial position before the next document can be exposed. The return phase has to be carried out after a document has been entirely scanned and, therefore, after the corresponding portion of the photosensitive member has left the exposure station. Of course, this system has an advantage in that the original document can be removed and a new document placed on the plate during the time that the return phase is being carried out, but both the return phase and the changing of the document are carried out after the photosensitive member has passed through the exposure station completely.

The two systems described above have another drawback when employed with a photosensitive member that moves continuously during exposure. Because of the time lost in changing the original document on the platen between scanning operations, a portion of the plate is necessarily not exposed as it continues through the exposure station resulting in a condition where exposures of succeding documents are not placed immediately adjacent one another on the photosensitive member. The fact that the entire plate cannot be used, therefore, necessarily limits the efficiency of the continuous process.

The apparatus described herein is a scanning system which avoids the time-consuming aspects inherent in the prior art scanning systems. In the present system the photosensitive member and original document move adjacent each other at the same speed and in the same direction. During scanning, the scanning device, including the light source and lens system, move between the original document and photosensitive member in the opposite direction relative to the movement of the original document and photosensitive member. Because of this relative movement, the photosensitive member can be fully exposed while only a portion of the photoreceptor passes out of the exposure station and the time necessary for the return phase and changing the original document can be taken as the exposed photosensitive member completely exits the exposure area. Due to this arrangement, each succeeding exposure can be formed on the photosensitive member immediately adjacent the preceding exposure thereby avoiding wasteful non-exposed areas on the photosensitive member.

Accordingly, it is an object of the invention to improve scanning apparatus in copiers.

It is a further object of the present invention to improve the speed at which an original document can be scanned in a system where both the original document and photosensitive member move at the same speed and in the same direction during exposure.

It is a further object of the present invention to improve the scanning system in a copier having a continuously moving photosensitive member by placing light images of the information to be reproduced immediately adjacent one another on the photosensitive member.

It is a further object of the present invention to improve the scanning speed of a copier in which the photosensitive member and original document move in the same direction at the same speed by moving the scanning device in the direction opposite to the direction that the original document and photosensitive member move.

SUMMARY

The present invention is a scanning system which can be used in a photocopier wherein an original document, or the like, is placed on a movable platen that carries it along a path parallel to a moving photosensitive member at the same speed as the photosensitive member. The scanning system includes a scanning device having a lamp adjacent the platen which illuminates the original document increment by increment to form light images of the information thereon which are reflected towards the photosensitive member, a lens system between the lamp and photosensitive member which focuses the reflected images onto the plate, and means to move the lamp and lens in a direction opposite to that of the photosensitive member and platen. The plate is exposed to the light image over an exposure area, or station, through which the lamp and lens pass. In one embodiment of the invention, the frame that carries the lamp and lens also carries a charging device which charges the photosensitive member immediately prior to its being exposed to the light image.

BRIEF DESCRIPTION OF THE DRAWINGS

For a better understanding of the invention as well as other objects and further features thereof, reference is had to the following detailed descriptions to be used in conjunction with the accompanying drawings, wherein.

DESCRIPTION OF THE PREFERRED EMBODIMENT

The present invention is a scanning apparatus used to form a light image of an object such as a document, or the like, by scanning the document in continuous, successive increments. Although the scanning apparatus has many applications, it is described within the environment of a reproduction system in which an original document is scanned and the light image resulting therefrom is projected onto a photosensitive member from which a copy of the original document is formed.

Figure 1A:
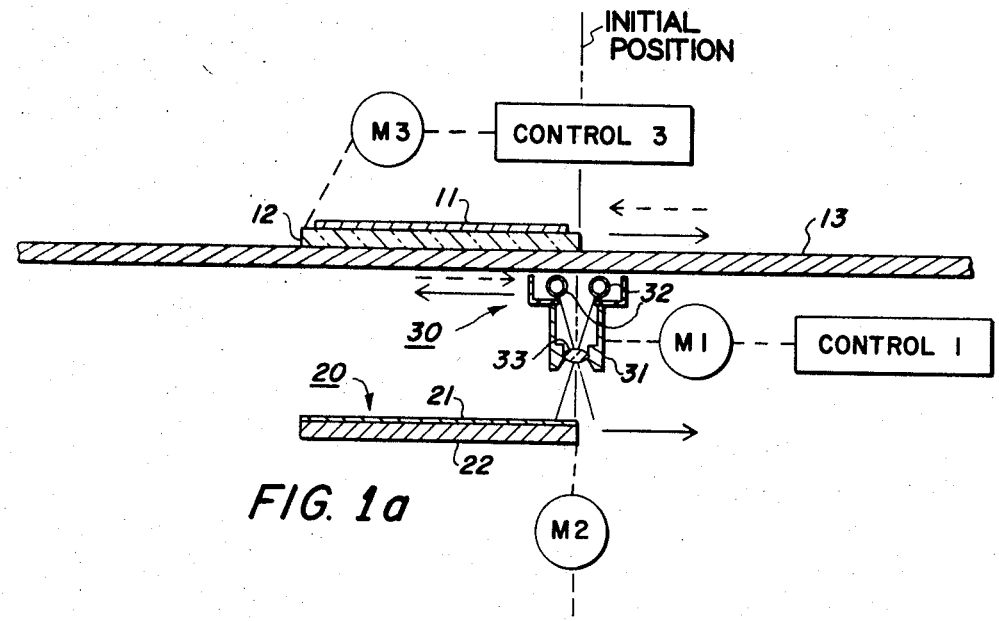
FIGS. 1a–1c are schematic illustrations of the invention at different stages of the scanning step.
Figure 1B:
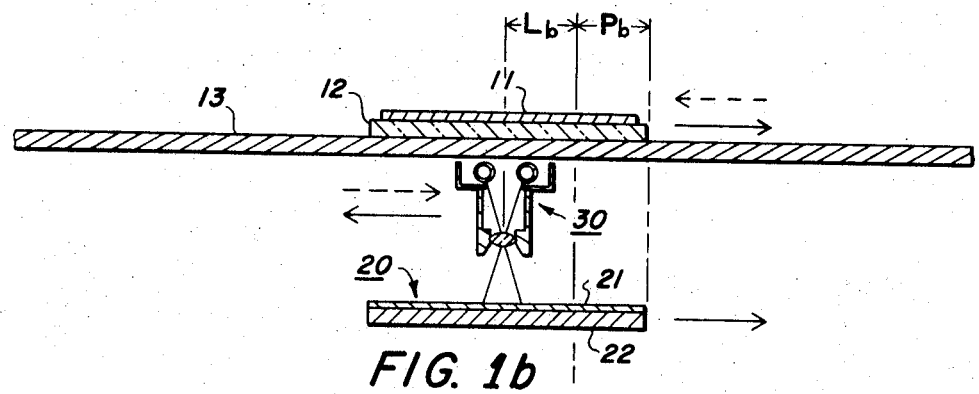
Figure 1C:
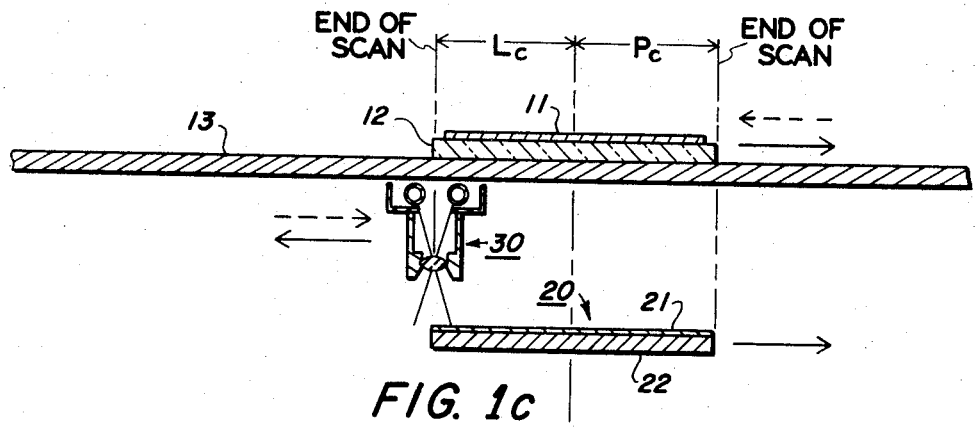

FIGS. 1a–c show a scanning system using a charged electrostatic plate 20 as the photosensitive member. The original document 11 which is to be reproduced is supported by platen 12 during the scanning step. The platen 12, which is supported for movement on the machine frame 13, is driven by any suitable drive means $M_3$ in both the left and right directions along the frame as indicated by broken and solid arrows, respectively, next to the platen. Adjacent the platen there is shown an electrostatic plate 20 upon which a reproduction of the original document can be formed. The plate can include a layer 21 of photoconductive material upon a conductive backing material 22. The photoconductive layer can be uniformly charged by any suitable means (not shown) prior to the scanning step. The plate 20 is supported for movement along a plane parallel to that of the platen 12 by any suitable drive means shown as $M_2$ and is driven continually in the direction shown by the arrow during the scanning operation.

Between the platen 12 and plate 20 is a scanning device 30 which is adapted to form light images of the information on the document 11 by illuminating the document increment by increment and focusing the reflected images from the document through lens means 33 onto the charged surface of plate 20. Scanning device 30 can be moved both to the right and left directions as shown by the broken and solid arrows, respectively, next to the scanning device by any suitable drive means shown as $M_1$.

The scanning device includes frame 31, which is driven by $M_1$, having mounted thereon lamps 32 which illuminate the document and lens means 33 which focuses the light images reflected from the document onto the surface of the plate 20. In FIGS. 1a–1c, as well as in the other figures, lamps 32 appear as though they are separated from the document platen 12 by frame 13. Acutally, the lamps are immediately adjacent the bottom surface of the transparent platen 12 without a member therebetween since the document platen 12 is recessed in the frame 13 in the exposure area. The frame 13 in the figures is exaggerated in thickness to better show its presence in the scanning system as the support for the platen.

Scanning device 30 has an operating cycle which carries it through two phases; the scan phase and the return phase. During the scan phase, the scanning device moves to the left as shown by the solid arrow to scan the information on the original document 11 and focus the light image onto the charged surface of plate 20. After the scanning phase has been completed, the scanning device starts the return phase towards its initial position which moves it to the right as indicated by the broken arrow. The movement of the scanning device 30 is controlled by control 1 which can be any suitable control device such as a combination of electrical circuits, clutches, gears, and limit switches which enable the system to operate as described above.

The platen 12 also has an operating cycle which carries it through a scan phase and a return phase. During the operating cycle of the platen 12, it begins to move at a predetermined speed to the right, as indicated by the solid arrow, through the scanning phase and, of course, carries original document 11 with it. After the document has been completely exposed onto the plate 20, the platen 12 starts its return phase to carry the document to the left, as indicated by the broken arrow, back to its initial position. The movement of the platen 12 is controlled by control 3 which like control 1 can be any suitable control device to enable the platen to operate as described above.

Before the operating cycle of the scanning system shown in FIG. 1 begins, the positions of the platen, scanning device, and photosensitive plate are shown in FIG. 1a. Assuming for the purpose of this description that the reference point on the platen is its right hand edge, on the scanning device is its optical centerline, and on the photosensitive plate is its right hand edge, the reference line identified as "Initial Position" in FIGS. 1a–c shows the initial position of these three elements before the scan phase is begun. As can be seen in FIG. 1a, the platen, scanning device, and photosensitive plate reference points all fall along the "Initial Position" line.

FIG. 1b shows the scanning system after the operating cycle has begun and the scan phase has been carried out to some extent, but before any of the elements reach their respective end-of-scan positions. The platen and scanning device at this time are moving to the right and left, respectively, while the plate 20 is moving to the left at the same speed and in a parallel path to the document plate. In FIG. 1b the platen 12 and photosensitive plate 20 have moved a distance "$P_b$" to the right of the "Initial Position" while the scanning device 30 has moved a distance "$L_b$" to the left. The absolute values of the distances "$P_b$" and "$L_b$" shown in FIG. 1b are arbitrary and are intended to describe the directions in which the various elements move during the scan phase.

FIG. 1c shows the three elements at the end-of-scan position after the scan phase is completed and as the return phase is about to begin. At this time the scanning device has passed adjacent the entire original document and has completed the exposure of charged plate 20. At this position, the photosensitive plate 20 and platen 12 have travelled to the right a distance indicated by "$P_c$" where the platen has reached its end-of-scan position, and the scanning device 30 has travelled to the left a distance "$L_c$" where it has reached its end-of-scan position.

The platen and scanning device are now ready to start their return phases which brings them back to the initial position as the photosensitive plate continues to move to the right out of the exposure station and into suitable processing stations. During the return phase, the scanning device moves to the right while the platen moves to the left, as indicated by their respective broken arrows.

Figure 2:
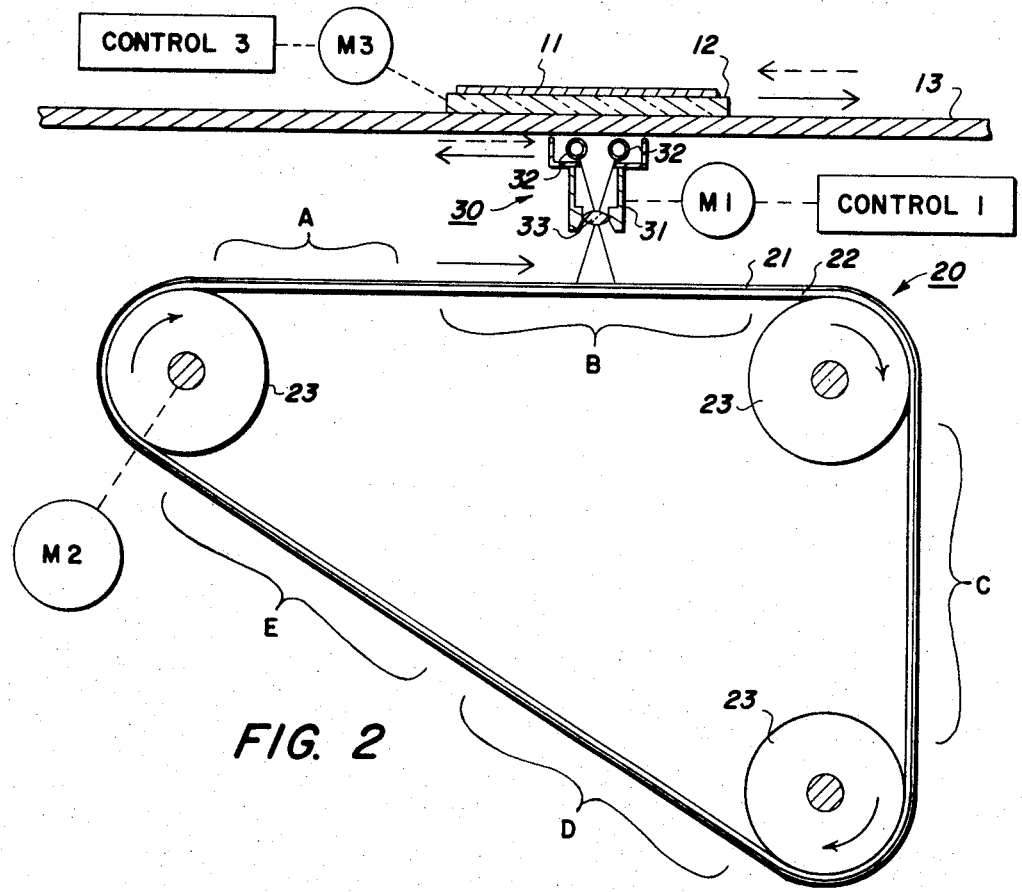
FIG. 2 is a schematic illustration of the invention using a photosensitive belt.

FIG. 2 shows a continuous xerographic system to which the present invention can be readily adapted. The reproduction system employs a photosensitive member which is in the shape of an endless flexible belt 20. The belt is supported by rollers 23 which rotate to enable the belt to move in the clockwise direction as indicated by the solid arrow adjacent it. The belt is driven at a constant predetermined speed by any suitable drive means which is shown as drive means $M_2$. The photosensitive belt includes a layer 21 of photoconductive material on a backing material 22 made of conductive material.

As the belt is rotated in the clockwise direction it's outer surface, or photoconductive layer, passes through several processing stations; charging station A, exposure station B, development station C, transfer station D and cleaning station E. The charging station contains a device which places a uniform electrostatic charge on the photoconductive layer of the belt in preparation to the belt passing through the exposure station. The charging device can be any suitable device such as a corona charging device which sprays a uniform charge over the surface of the belt.

Exposure station B is the area in which the light image formed by the scanning device is projected onto the belt surface. The exposure station includes that area adjacent the belt through which the scanning device moves from its initial position to an end-of-scan position. The light image which is created by the scanning device is exposed onto the belt where it dissipates the electrostatic charge in those portions of the belt struck by light to form a latent electrostatic image of the information on document 11. The operation of the scanning station is described in more detail below.

The belt then passes through development station C, where a suitable electroscopic, resineous, pigmented powder material such as toner is placed in contact with the belt surface to develop the latent image thereon. The toner adheres to the belt surface in the configuration of the latent image thereby developing the latent image. The development apparatus can include any suitable means for placing the toner particles on the surface of the belt such as a cascade system which flows a combination of toner particles and carrier beads across the surface of the belt.

After development of the latent image, the surface of the belt passes through transfer station D where the toner image is transferred from the surface of the belt to any suitable support surface such as a sheet of paper which is fed into contact with the toner image in the transfer station. In addition to a transfer device such as an electrostatic charging device, the transfer station can include any suitable feeding mechanism adapted to feed the support material adjacent the drum and in synchronism therewith during the transfer of the toner image. After the toner image is transferred to a copy sheet and the copy sheet is removed from the surface of the belt, the belt passes through cleaning station E where any residue toner particles are removed from the surface of the belt in preparation for a subsequent cycle through the various processing stations mentioned above.

In the same manner as described in conjunction with FIGS. 1a–1c, the operating cycle of the scanning device and document platen in FIG. 2 has two phases, the scanning phase and the return phase. During the scanning phase, the document platen 12 moves the document to the right, as shown by the solid arrow, at the same speed that the flexible belt moves to the right in a plane parallel thereto. Then, during the scanning phase, the scanning device 30 moves to the left as shown by the solid arrow to place the images formed thereby on the surface of the flexible belt. The speed of the scanning device during the scanning phase can be any suitable speed, and, in high speed systems, may be very fast in order to carry out the exposure of the belt as quick as possible. The speed at which images are placed on the flexible belt or any other photosensitive plate is ultimately limited by the response of the plate to the light image. After the scanning apparatus has reached its end-of-scan position it moves to the right, as shown by the broken arrow, to its initial position in preparation for the next operating cycle. At this time the document platen 12 moves to the left as shown by the broken arrow, to assume its initial position in preparation for a new scanning cycle. During both phases of the operating cycle described above, the flexible belt moves at the same speed and in the same direction through exposure station B.

Since the document platen and the belt move in the same direction at the same speed through exposure station B, the scanning device 30 can move to the left at a very rapid speed, and then return to its initial position after scanning has been completed before the latent image on the belt passes beyond the initial position. This situation enables the original document to be replaced on the platen by a new document at a time when the belt is still in the exposure station. In this manner, there need not be any time wasted between scanning cycles to change the original and succeeding document can be copied onto the belt immediately adjacent one another without a gap therebetween.

Figure 3:
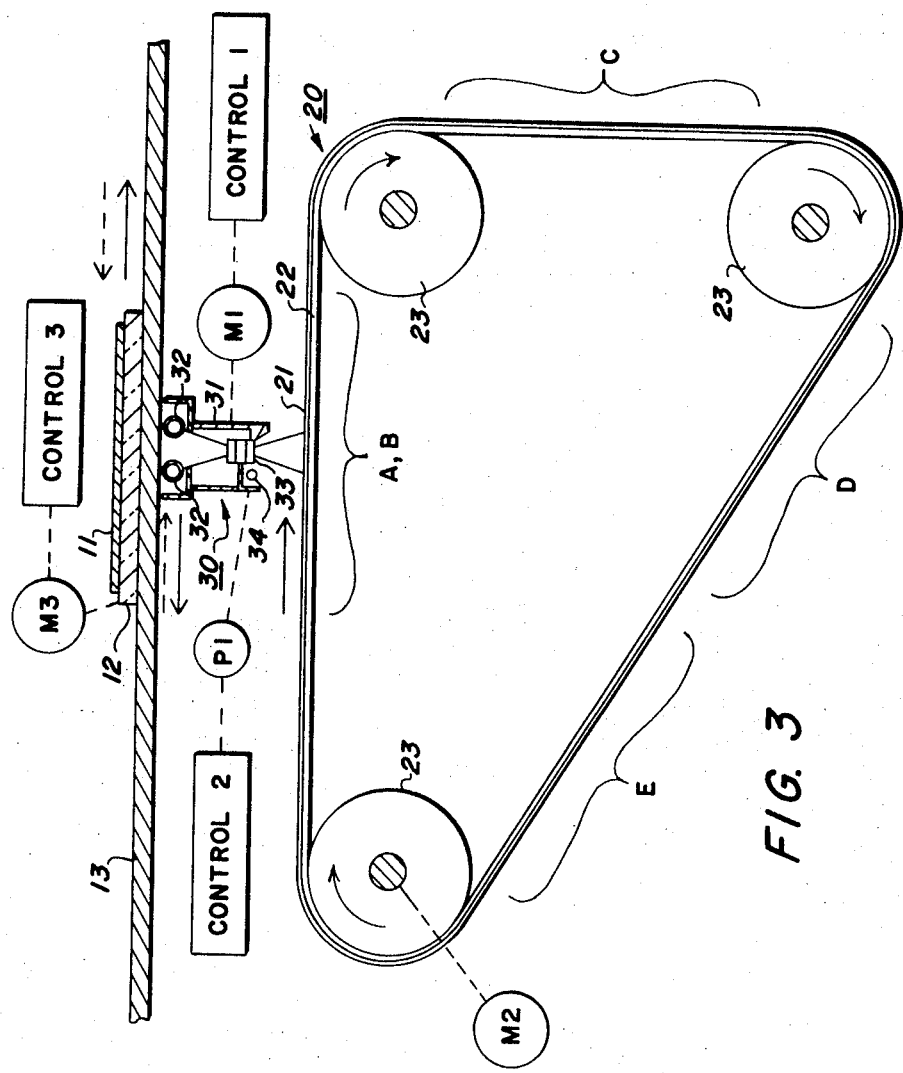
FIG. 3 is a schematic illustration of the invention wherein the scanning device includes a charging apparatus.

FIG. 3 shows an alternative embodiment of the copying system. In this embodiment a charging device 34 can be made part of the scanning device frame 31 and precede the light image through the exposure station. As indicated by the A and B at the bracket, the station through which the scanning device moves in this situation is a combined charging and exposure station. By placing the charging device on the scanning device, the charge is sprayed on the belt immediately before the light image is exposed onto the belt and, as a result, there is very little opportunity for the charge on the belt to dissipate significantly before the latent image is formed thereon. A suitable control device indicated as control 2 can be placed on the power source $P_1$ which activates the charging device 34 only while the scanning device is actually traveling through the exposure station during the scan phase of the operating cycle. When such a control is used to operate the charging device, the photosensitive belt is charged only along those portions of its surface which are actually being used to make reproduction while all other portions of the belt do not receive a charge.

Figure 4:
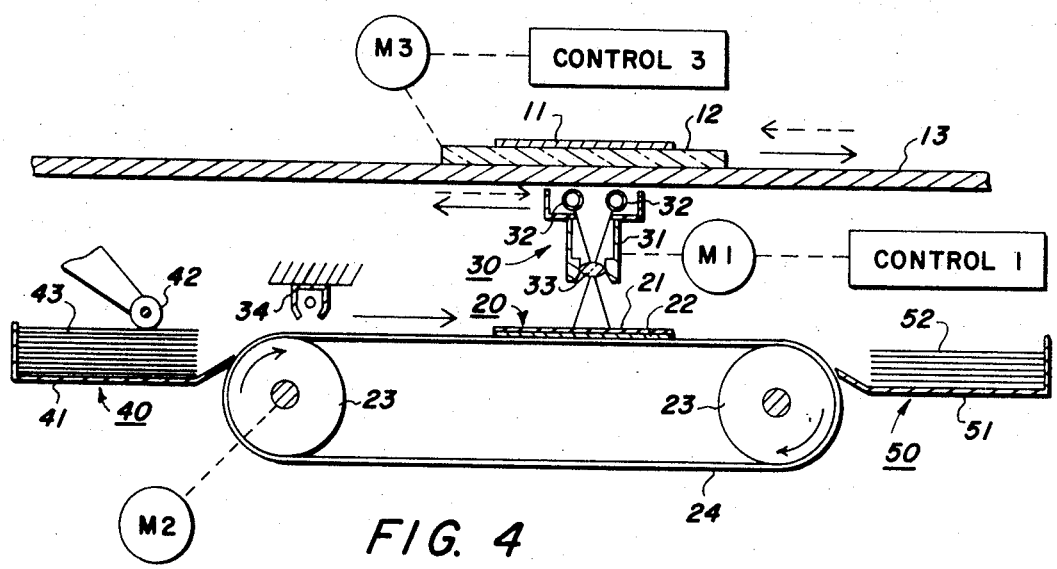
FIG. 4 is a schematic illustration of the invention in a copier which forms reproductions directly on photosensitive copy sheets.

Another embodiment of the invention is shown in FIG. 4. In this figure, the photosensitive member 20 consists of a sheet of paper that is treated with a photosensitive material on one surface. The photosensitive paper is carried through the area adjacent the scanning device on any suitable conveyor apparatus such as conveyor 24 which is supported by rollers 23 and driven by any suitable drive means indicated by $M_2$. The treated paper is fed onto the conveyor mechanism by feeding apparatus 40 from stacks 43 which is contained within the supply tray 41 by the feed roller 42. The treated paper, once on the conveyor, then passes beneath charging device 34 which sprays a uniform charge across the treated surface of the paper. The belt carries the treated paper in the direction shown by the solid arrow adjacent the document platen and scanning device where an optical image of the information on the document is imaged onto the treated surface of the paper in the manner described above in conjunction with the other figures. As a result of being exposed to an optical image of the information on the original document, a latent image is produced on the surface of the sheet as it passes adjacent the scanning apparatus. The treated paper is then brought to the end of the conveyor and placed in a collection apparatus 50 by dropping into tray 51 where the stack 52 is held until further processing steps can be carried out on the treated paper. It should be pointed out at this point that sheet feeding apparatus 40 and sheet collection apparatus 50, as well as the conveyor system shown in FIG. 4, are only illustrative of any suitable device that can be used in conjunction with using the present invention with the treated paper.

In addition to the apparatus outlined above, many other modifications and additions to this invention will be readily understood by those skilled in the art upon reading this disclosure and these are intended to be encompassed within the disclosure in claims of the invention herein.

What is claimed is:

1. Apparatus for recording an image of an original upon an image retaining element including
    means to move the image recording element along a first path of travel,
    means to move the original along a second path of travel in fixed timed relation with said image recording member wherein there is no relative movement therebetween,
    a scanning device interposed between the image recording element and the original, said scanning device being arranged to focus an image of the original upon said image retaining element, and
    means to move said scanning device in opposition to the direction of movement of said image retaining element and said original whereby a flowing light image of the original is recorded on the image retaining element.

2. The apparatus of claim 1 wherein said means to move the scanning device is arranged to move the scanning device along a path of travel substantially parallel to that of the image retaining element.

3. The apparatus of claim 2 including further means to restore the apparatus to a start of scan position.

4. An apparatus for exposing a photosensitive member to a light pattern conforming to information on an original document, or the like, comprising:
    a. a photosensitive member;
    b. means to move the photosensitive member along a plane in a predetermined direction at a predetermined speed;
    c. transparent means to support the original document adjacent the photosensitive member in a plane parallel to that along which the photosensitive member moves;
    d. means to move the transparent means along a plane parallel to the plane of movement of the photosensitive member in the predetermined direction at the predetermined speed;
    e. a scanning device between the transparent means and photosensitive member having means to illuminate the original document on the transparent means increment by increment and means to focus the reflected light pattern onto the surface of the photosensitive member; and
    f. means to move the scanning device parallel to the transparent means and photosensitive member in the direction opposite to the predetermined direction to form an image of the document on the photosensitive member.

5. The apparatus in claim 4 wherein the scanning device includes a movable frame having at least one lamp mounted thereon to move immediately adjacent the transparent means and a lens means between the lamp and photosensitive member to focus the reflected light pattern onto the surface of the photosensitive member.

6. The apparatus in claim 5 wherein the photosensitive member is a photoconductive plate having a layer of photoconductive material over a conductive backing material, and, further including, a charging means mounted on the side of the frame facing the direction of movement of the scanning apparatus adapted to charge the photoconductive layer of the plate immediately prior to its being exposed to the light pattern.

7. The apparatus in claim 5 wherein the photosensitive member is a sheet of paper, or the like, having a photoconductive layer thereon facing the transparent means and the means to move the sheet is a sheet conveyor means.

8. An apparatus for exposing a photosensitive member to a light pattern conforming to the information on an original document having an operating cycle including a scan phase and a return phase comprising:
   a. a photosensitive member
   b. means to move the photosensitive member along a plane in a predetermined direction at a predetermined speed;
   c. transparent means to support the original document adjacent the photosensitive member in a plane parallel to that of the photosensitive member;
   d. a scanning device between the transparent means and photosensitive member for illuminating an original document on the transparent means increment by increment and focusing the reflected light pattern onto the surface of the photosensitive member;
   e. means to move the transparent means along a plane parallel to the plane of movement of the photosensitive member in the predetermined direction at the predetermined speed between an initial position and an end-of-scan position, the initial position of the scanning device being such that it does not pass the leading edge of the document until after the scan phase has begun;
   f. means to move the scanning device parallel to the transparent means and photosensitive member between an initial position and an end-of-scan position;
   g. means to control the movement of the transparent means so that during the scan phase the transparent means moves in the same direction as the photosensitive member from its initial position to its end-of-scan position and during the return phase moves in the opposite direction as the photosensitive member from its end-of-scan position to its initial position; and
   h. means to control the movement of the scanning device so that during the scanning phase it moves in the direction opposite to that of the photosensitive member from its initial position to its end-of-scan position and during the return phase moves in the same direction as the photosensitive member from its end-of-scan position to its initial position.

9. The apparatus in claim 8 wherein the speed at which the transparent means and scanning device move during their respective return phases is faster than that during their respective scan phases.

* * * * *